(12) United States Patent
Goodfellow-Jones

(10) Patent No.: US 11,472,134 B2
(45) Date of Patent: Oct. 18, 2022

(54) ELECTROTHERMAL HEATER MAT

(71) Applicant: GKN Aerospace Services Limited, Redditch (GB)

(72) Inventor: Stephen Goodfellow-Jones, Redditch (GB)

(73) Assignee: GKN Aerospace Services Limited, Redditch (GB)

( * ) Notice: Subject to any disclaimer, the term of this patent is extended or adjusted under 35 U.S.C. 154(b) by 302 days.

(21) Appl. No.: 16/647,544

(22) PCT Filed: Sep. 18, 2018

(86) PCT No.: PCT/GB2018/052657
§ 371 (c)(1),
(2) Date: Mar. 16, 2020

(87) PCT Pub. No.: WO2019/058109
PCT Pub. Date: Mar. 28, 2019

(65) Prior Publication Data
US 2020/0269526 A1  Aug. 27, 2020

(30) Foreign Application Priority Data
Sep. 19, 2017 (GB) .................................... 1715093

(51) Int. Cl.
*B29C 70/30* (2006.01)
*B29C 70/88* (2006.01)
(Continued)

(52) U.S. Cl.
CPC ............ *B29C 70/30* (2013.01); *B29C 70/885* (2013.01); *B64D 15/12* (2013.01); *H05B 3/36* (2013.01); *B29L 2031/779* (2013.01)

(58) Field of Classification Search
CPC ......... Y10T 156/1028; Y10T 156/1043; Y10T 156/1044; B32B 38/12; B32B 38/1866;
(Continued)

(56) References Cited

U.S. PATENT DOCUMENTS 5,203,940 A * 4/1993 Krone ..................... B29C 70/46
264/108
2004/0003886 A1* 1/2004 Hunter ................ B32B 38/1866
156/219

(Continued)

FOREIGN PATENT DOCUMENTS

CN 101522419 A 9/2009
CN 102822056 A 12/2012
(Continued)

OTHER PUBLICATIONS

"PEEK" from erteco.se as captured by archive.org Mar. 2016.*
(Continued)

*Primary Examiner* — John L Goff, II
(74) *Attorney, Agent, or Firm* — Bejin Bieneman PLC

(57) ABSTRACT

In manufacturing an electrothermal heater mat, there is provided a preform which comprises a laminated stack of dielectric layers which are made of thermoplastic material and include a central layer or group of layers which include(s) reinforcement and first and second outer groups of layers which do not include reinforcement. The preform includes a heater element and the preform has a first configuration. The preform is then heated to a temperature (e.g. 180° C.) between the glass-transition temperature of the thermoplastic material and the melting point of the thermoplastic material, and the heated preform is formed into a second configuration which is different to the first configuration so as to produce the heater mat.

17 Claims, 6 Drawing Sheets

(51) Int. Cl.
*B64D 15/12* (2006.01)
*H05B 3/36* (2006.01)
*B29L 31/00* (2006.01)

(58) Field of Classification Search
CPC . B29C 65/70; B29C 65/7808; B29C 65/7811; B29C 65/7844; B29C 66/81422; B29C 70/541; B29C 70/30; B29C 70/885; B29C 70/78; B29C 53/04; B29C 53/84; B29C 35/0272; B29L 2031/779; B29L 2031/085; B29L 2031/3005; B29D 99/0025; B64D 15/12; B64D 15/14; B64D 2033/0233; H05B 3/36; H05B 2203/033; H05B 2203/017; H05B 2214/02

See application file for complete search history.

(56) References Cited

U.S. PATENT DOCUMENTS

| | | | |
|---|---|---|---|
| 2005/0137067 A1 | 6/2005 | Kemery et al. | |
| 2006/0226581 A1* | 10/2006 | Kelly | B29C 53/083 264/339 |
| 2007/0210073 A1 | 9/2007 | Hubert et al. | |
| 2011/0024568 A1 | 2/2011 | Bardwell | |
| 2015/0053662 A1 | 2/2015 | Hu et al. | |
| 2017/0144361 A1* | 5/2017 | Hills | B29C 51/261 |

FOREIGN PATENT DOCUMENTS

| | | | |
|---|---|---|---|
| CN | 103202093 A | 7/2013 |
| CN | 105058770 A | 11/2015 |
| CN | 107061193 A | 8/2017 |
| DE | 3144781 A1 | 5/1983 |
| EP | 1757519 A2 | 2/2007 |
| EP | 1826119 A2 | 8/2007 |
| EP | 1845018 A2 | 10/2007 |
| GB | 833675 A | 4/1960 |
| GB | 2438389 A | 11/2007 |
| GB | 2453769 A | 4/2009 |
| GB | 2477336 A | 8/2011 |
| GB | 2477337 A | 8/2011 |
| GB | 2477338 A | 8/2011 |
| GB | 2477339 A | 8/2011 |
| GB | 2477340 A | 8/2011 |
| JP | 2003317904 A | 11/2003 |

OTHER PUBLICATIONS

"PPS" from erteco.se as captured by archive.org Mar. 2016.*
China National Intellectual Property Administration Office Action dated Jun. 29, 2021 for Application No. CN2018800060486.4 (29 pages; with English machine translation).
China National Intellecutal Property Adminstration Office Action dated Jan. 11, 2022 for related Chinese Application No. CN 201880060486.4 (33 pages; Original with English translation).
International Search Report and Written Opinion for PCT/GB2018/052657 dated Nov. 30, 2018 (12 pages).
UKIPO Search Report under Section 17(5) for Application No. GB1715093.9 dated Mar. 15, 2018 (5 pages).

* cited by examiner

ELECTROTHERMAL HEATER MAT

CROSS-REFERENCE TO RELATED APPLICATIONS

This application is a national stage of, and claims priority to, Patent Cooperation Treaty Application No. PCT/GB2018/052657, filed on Sep. 18, 2018, which application claims priority to Great Britain Application No. GB 1715093.9, filed on Sep. 19, 2017, which applications are hereby incorporated herein by reference in their entireties.

BACKGROUND

For an aircraft, the in-flight formation of ice on the external surface of the aircraft is undesirable. The ice hinders the smooth flow of air over the aircraft surface, increasing drag and additionally decreasing the ability of an aerofoil to perform its intended function.

Also, built-up ice may impede the movement of a movable control surface such as a wing slat or flap. Ice which has built up on an engine air inlet may be suddenly shed in large chunks which are ingested into the engine and cause damage.

It is therefore common for aircraft, and particularly commercial aircraft, to incorporate an ice protection system. A commercial aircraft may use a system which involves bleeding hot air off from the engines, and the hot air is then ducted to the airframe components such as the leading edges of the wing and the tail which are prone to ice formation. More recently, electrically powered systems have been proposed, such as in EP-A-1,757,519 (GKN Aerospace) which discloses a wing slat having a nose skin which incorporates an electrothermal heater blanket or mat. The heater mat is bonded to the rear surface of a metallic erosion shield which comprises the forwardly-facing external surface of the nose skin.

The heater mat is of the SPRAYMAT (trade mark) type and is a laminated product comprising dielectric layers made of pre-impregnated glass fibre cloth and a heater element formed by flame spraying a metal layer onto one of the dielectric layers. The "Spraymat" has a long history from its original development in the 1950s by D. Napier & Sons Limited (see their GB-833,675 relating to electrical de-icing or anti-icing apparatus for an aircraft) through to its subsequent use by GKN Aerospace.

A "Spraymat" produced in recent years for use in a wing slat is formed on a male tool and involves laying up a stack of layers comprising (i) about 10 layers of glass fibre fabric pre-impregnated with epoxy which has been cured in an autoclave, (ii) a conductive metal layer (the heater element) which, as has been done in previous products, has been flame sprayed onto the laminate using a mask to form the heater element pattern and (iii) a final 3 or so layers of the glass fibre fabric. Wiring is soldered to the heater element to permit connection to the aircraft's power system. The heater mat is then cured in an autoclave.

A heater mat often incorporates a conductive ground plane as a safety device for detecting a fault with a heater element of the heater mat. The ground plane is connected to an aircraft earth as well as to a control unit.

A heater mat is generally very reliable. However, if the heater element in the heater mat does develop a fault in the form of heater burn-out, current will leak to the aircraft earth via the ground plane and the control unit can detect this change in current and take action to prevent thermal damage to the structure of the heater mat.

GKN Aerospace has recently developed a technique of applying the heater element and the ground plane as a flame sprayed metal layer (such as of copper or copper alloy) where the heater element or ground plane is sprayed (using a mask) onto a dielectric ply layer which is made of thermoplastic material instead of the previously-used thermosetting (e.g. epoxy resin) material. This newer type of arrangement for the heater element and ground plane is described in GB-A-2,477,336, GB-A-2,477,337, GB-A-2,477,338, GB-A-2,477,339, and GB-A-2,477,340 (all in the name of GKN Aerospace), the disclosures of which are incorporated herein by reference in their entireties.

Glass-reinforced thermoplastic laminates are widely used in the aerospace and automotive industries when thermoplastic material is being used as an alternative to epoxy-glass (thermosetting) material.

However, engineering thermoplastics usually have higher melting points relative to epoxy materials, and the higher processing temperatures that are involved require higher investment in capital equipment, tooling and consumables.

For example, thermoplastic typically needs to be heated to about 400° C. when fusing laminate layers together. This means that the tool on which the lamination is performed needs to be made of steel instead of the aluminium typically used for the lower processing temperatures of thermosetting materials.

When producing a heater mat which is required to have a 3-D (curved) shape or configuration, the desired final shape of the heater mat may be achieved directly by performing the lamination on a steel tool having the desired 3-D shape.

Alternatively, the layers of the heater mat may initially be laminated together whilst the heater mat has a flat (2-D) shape, on a flat table made of steel. By performing the initial (first) step of the production on a flat table, a high production rate may be achieved. The heater mat is then formed into the desired final, curved (3-D) shape using tooling, for example by bending (by forming) the 2-D heater mat around a suitably curved (3-D) tool surface of a tool. The tool for this second step is made of steel because the preform (the 2-D heater mat) is re-heated to above the melting point of the thermoplastic material of the preform, to a temperature which may affect the tempering and shape of an aluminium tool. During this second (forming) step, a vacuum bag typically made of polyimide material covers the preform to assist with the forming operation being performed on the heater mat.

It would be desirable to improve the production of a heater mat made of thermoplastic composite.

SUMMARY

The present disclosure relates generally to an electrothermal heater mat and method of manufacture thereof, including an electrothermal heater mat for use in an ice protection system. The electrothermal heater mats are suitable for a range of applications where ice may form on a surface but in particular they are suitable for use in an aircraft or other aerodynamic structure such as a blade of a wind turbine to prevent ice from forming and/or to remove ice that has already formed. These two functions may be termed anti-icing and de-icing, respectively.

According to an aspect, there is provided a method of manufacturing an electrothermal heater mat, comprising the steps of: providing a preform which comprises a laminated stack of dielectric layers which are made of thermoplastic material and include a central layer or group of layers which include(s) a reinforcement material and first and second outer groups of layers which do not include the reinforcement material; wherein the preform includes a heater element and the preform has a first configuration; heating the preform to a temperature between the glass-transition temperature of the thermoplastic material and the melting point of the thermoplastic material; and forming the heated preform into a second configuration which is different to the first configuration so as to produce the heater mat.

Because the forming is being performed at a temperature below the melting point of the thermoplastic material, the temperature associated with the forming step is significantly lower than was previously the case when forming heater mats made of thermoplastic composite, and thus the tooling that is used does not have to resist the previous high temperatures. Therefore, instead of having to use heavy steel tooling, it is possible to use the standard aluminium tooling typically used for forming epoxy (thermosetting) composites. This may produce a significant cost saving.

The reinforcement is limited to being at or predominantly at the central thickness of the preform (effectively at the neutral axis for the bending associated with the forming step) and this enables the forming to occur despite the fact that the matrix material of the preform (the thermoplastic) is only being softened and not melted.

The thermoplastic matrix undergoes a form of creep when softened, and this enables the heater mat preform to be shaped in the forming step.

The lower temperature associated with only softening the thermoplastic matrix material means that the electrical characteristics of the heater element are less impaired by the heating associated with the forming operation. Similarly, if the preform includes other functional components (e.g. a conductive ground plane), they also experience reduced impairment from the heating than would be the case with a higher temperature associated with actually melting the thermoplastic matrix material.

The thermoplastic material may be PEEK, PEKK, PPS, PEI or PES or a mixture thereof. More preferably, the thermoplastic material is PEEK, PEKK or a mixture thereof.

When the first configuration of the preform is an un-flexed configuration (e.g. a flat configuration), the preform in the forming step may be flexed into the second configuration and initially it will have a tendency to want to return to the first configuration. As the forming step progresses, the thermoplastic material of the heated preform creep-forms, and the permanent shape (or set) of the preform progresses towards the second configuration.

In examples, the first configuration is a substantially planar configuration, and/or the second configuration is a curved configuration in which the heater mat is non-planar.

In the second configuration, the heater mat may have a concave rear face and a convex front face. This will often be the case when the heater mat is intended to be used on an aerofoil leading edge.

In examples, all of the dielectric layers of the preform are made from thermoplastic material. The same thermoplastic material may be used for each dielectric layer of the preform.

In some examples, the preform includes one or more conductive ground plane layer(s) and/or a temperature sensor layer.

In some examples, the method may include the preliminary steps of:
providing a stack containing a plurality of dielectric layers and a heater element layer;
wherein each layer comprises thermoplastic material; and
heating the stack to a temperature above the melting point of the thermoplastic material and laminating together the layers of the stack so as to produce an intermediate product (the preform) having the first configuration.

In some examples, in the second configuration, the heater mat is generally U-shaped in cross-section.

In some examples, in the forming step, the preform is positioned on a tool which has a tool surface with a third configuration which is more-curved than the second configuration and the preform is formed down onto the tool surface; and, after the heater mat is removed from the tool, the heater mat relaxes from the third configuration to the second configuration. The degree of "spring back" from the third configuration to the second configuration will depend on factors such as the duration of the heating and forming operations and the temperature during the heating and forming operations.

In some examples, in the heating step, the preform is heated to and held at a temperature in the range 180° C.±30° C. (or ±20° C., or ±10° C.). Thus, the forming is performed at a temperature which is above the typical glass-transition temperature of 140 to 150° C. of the thermoplastic materials that are typically used in the production of heater mats.

In some examples, the preform has a thickness of 1 mm or less. This results in a heater mat of similar thickness, and the thickness is less than the thickness (of 2 to 3 mm) which is typical of current epoxy heater mats.

In some examples, in the forming step, the heated preform is held at the temperature for a period of time from 15 to 60 minutes (or from 20 to 40 minutes, or for about 30 minutes).

In some examples, the reinforcement is glass reinforcement, e.g. woven e-glass.

In some examples, in the forming step, the heated preform is positioned on a tool having a tool surface with a ridge and the preform is formed around the ridge. The ridge may include positioning pins and the preform has apertures which are fitted onto the pins. The apertures may be positioned along a central longitudinal axis of the preform. The apertures and pins may serve to achieve a desired relative positioning of the preform on the tool, and to maintain that positioning during the heating and forming operations.

In some examples, in the forming step, the heated preform is positioned on a tool having a convex tool surface and a vacuum bag is used to hold the preform down onto the convex tool surface.

In some examples, in the forming step the heated preform is positioned on a tool having a convex tool surface; and after the forming step the heater mat produced by forming the preform is returned to an ambient temperature before the heater mat is removed from the tool surface.

In some examples, the second configuration is generally U-shaped in a transverse direction of the heater mat and tapers and/or twists in a longitudinal direction of the heater mat.

In some examples, the preform is formed against a tool which has a tool surface which is convex in a transverse direction and which become more convex in a longitudinal direction and/or twists in a longitudinal direction.

The variation in the longitudinal direction allows the heater mat to be produced with the laminate of the heater mat having slight conformance to double-curved surfaces, such as are found in a wing leading edge which has a degree of twist and taper along the leading edge.

According to another aspect, there is provided a method of manufacturing an electrothermal heater mat, comprising the steps of: laying up a stack comprising substantially planar layers which include a plurality of dielectric layers and a heater element layer; wherein each layer comprises thermoplastic material; heating the stack to a first temperature and laminating together the layers of the stack so as to produce a preform; positioning the preform on a convex surface of a tool; heating the preform to a second temperature which is lower than the first temperature and is in a range of 180° C.±30° C.; and forming the preform around the convex surface of the tool. Features of the previous aspect of the present invention may be applied mutatis mutandis to this aspect, and vice versa.

According to another aspect, there is provided a method of manufacturing an ice-protected apparatus, comprising the steps of: performing a method of manufacturing an electrothermal heater mat as described herein and, in the heating and forming steps, positioning the preform against a component comprising thermosetting material and using the heating of the heating step to bond the preform to the component.

Thus, the heater mat may be co-bonded to, for example, an epoxy component (such as part of an aerofoil leading edge) and cured in a single heating operation. In other words, the heating operation which is used to soften the preform to form the final shape of the heater mat is also used to cure the component made of thermosetting material.

In some examples, the component has a surface which has the second configuration and to which the preform is bonded. For example, the component may have a rear surface which is concave.

In some examples, in the heating and forming steps, the preform is positioned between a tool and the component. Thus, the component helps to hold the final (second) shape of the heater mat during the creep-forming operation. This may remove the need to use a vacuum bag, e.g. if the preform is completely covered by the component when the preform is seated on the tool.

BRIEF DESCRIPTION OF THE DRAWINGS

Some examples will now be described with reference to the accompanying drawings in which: —

Figure 1:
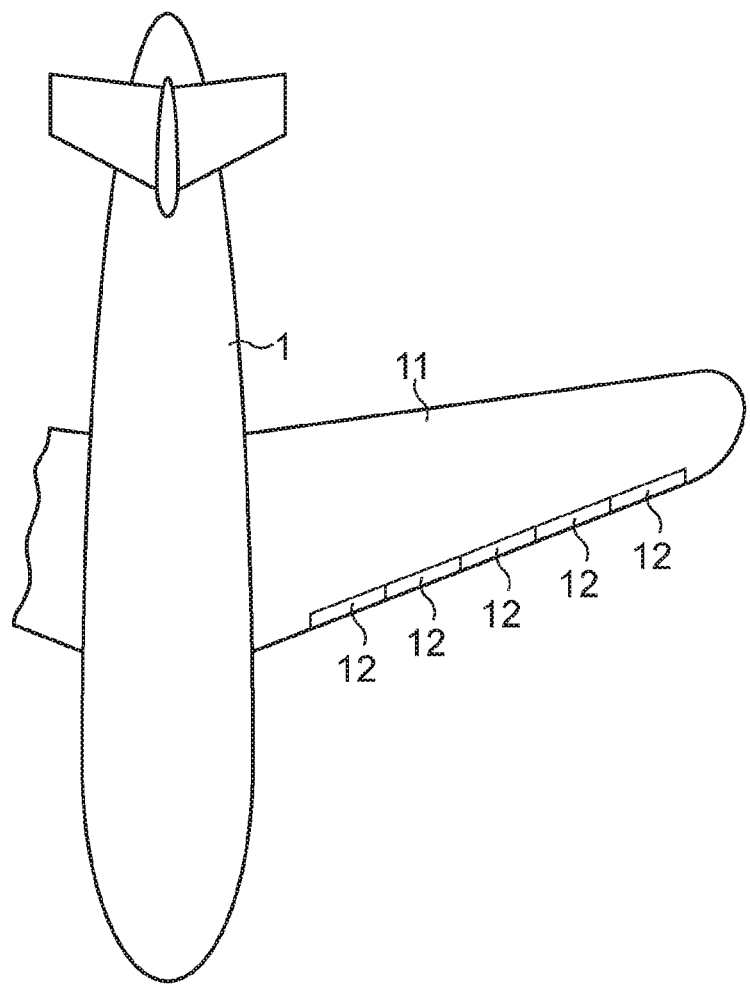
FIG. 1 is a diagrammatic plan view of an aircraft having slats in the leading edge of a wing.

While the invention is susceptible to various modifications and alternative forms, some examples are shown by way of example in the drawings and are herein described in detail. It should be understood, however, that the drawings and detailed description of these examples are not intended to limit the invention to the particular forms disclosed. In addition although individual examples may have been discussed, the invention is intended to cover combinations of those examples. The invention covers all modifications, equivalents and alternatives falling within the spirit and the scope of the present invention as defined by the appended claims.

DESCRIPTION

FIG. 1 is a plan view of an aircraft 1 having a wing 11 along the leading (forward) edge of which are positioned five wing slats 12. Each wing slat 12 incorporates an electrothermal ice protection system.

Figure 2:
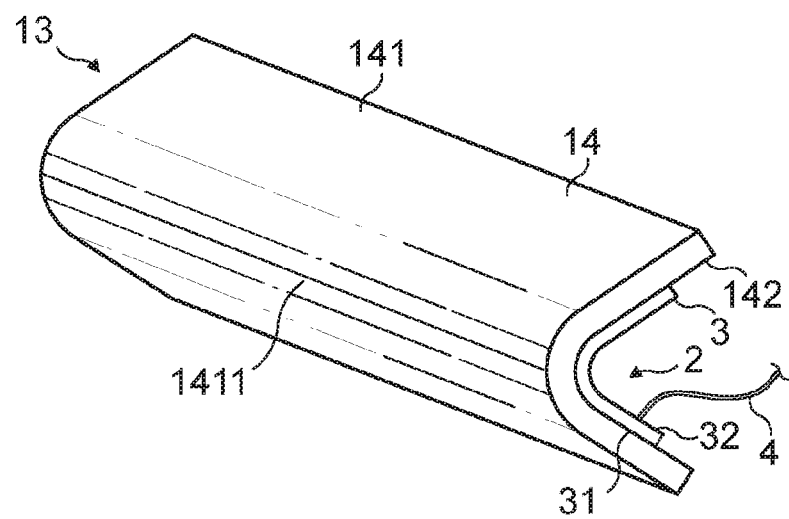
FIG. 2 is a diagrammatic perspective view of a nose skin of a wing slat of FIG. 1.

FIG. 2 is a diagrammatic perspective view of a demountable nose skin 13 of one of the wing slats 12 of FIG. 1. The configuration of the nose skin 13 may be generally the same as in EP-A-1,757,519 (GKN Aerospace) which discloses a wing slat having a demountable forward section comprising a nose skin.

The nose skin 13 comprises an erosion shield 14 and an electrically-powered heater 2.

The heater 2 comprises a heater blanket or mat 3 and a bundle of wires or lines 4 which connect the heater mat 3 to associated power supply and control electronics.

The erosion shield 14 is generally rectangular and has a front surface 141 which is convexly curved and a rear surface 142 which is concavely curved. An apex 1411 of the front surface 141 provides the leading edge of the aircraft wing 11.

The heater mat 3 is generally rectangular and has a front surface 31 which is convexly curved and a rear surface 32 which is concavely curved. The convex front surface 31 conforms to the shape of and is bonded to the rear surface 142 of the erosion shield 14. In this way, thermal energy generated as the heater mat 3 is operated passes, by conduction, into the erosion shield 14 in order to provide an ice protection function. The erosion shield 14 is metallic and may be made of aluminium or titanium. A function of the erosion shield 14 is to protect the aircraft against lightning strikes by absorbing and dissipating the lightning current.

The concave rear surface 32 of the heater mat 3 may be attached to a support structure of the wing slat 12.

A manufacturing method for producing an electrothermal heater mat, in accordance with a first example of the present invention, will now be described with reference to FIGS. 3-9 which depict, in a diagrammatic manner, the stages of the method.

Figure 3:
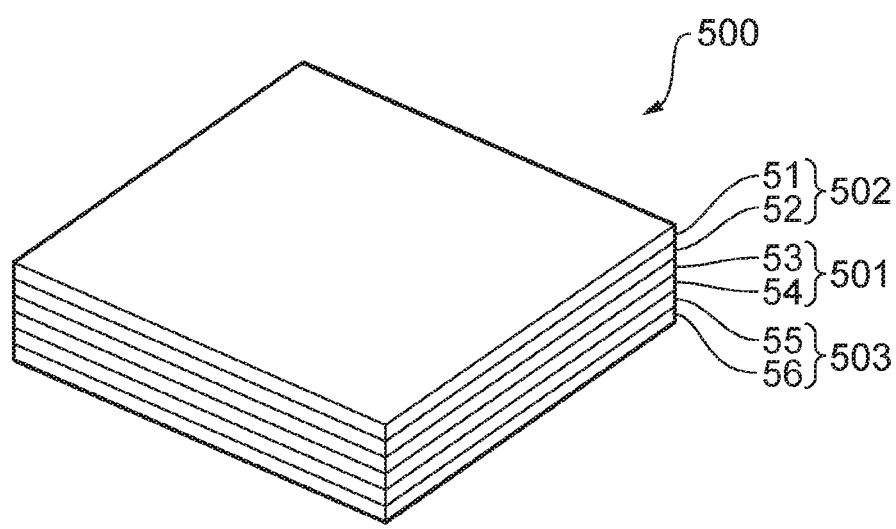
FIGS. 3 to 9 depict in a diagrammatic manner the stages of a manufacturing method for producing an electrothermal heater mat, in accordance with a first example.

FIG. 3 is a diagrammatic representation of a stack 500 of dielectric layers 51-56 at a first stage of an example manufacturing method.

The depiction of the dielectric layers 51-56 is diagrammatic and does not depict scale or proportions. For example, in relation to each dielectric layer, the thickness has been exaggerated for the sake of clarity. Also, the width and length of the layer have been reduced for the sake of clarity. In a practical example, the dielectric layer would be generally rectangular and would be a sheet having a width ranging typically from 0.25 m (meter) to 0.6 m and a length ranging from typically 1 m to 4 m. In one example in use, the width of the sheet may wrap around the chord at the leading edge of the wing, and the length of the sheet may extend along the span of the wing. The dielectric sheet (the dielectric layer) would also typically have a thickness of 0.05 mm (millimeter) to 0.25 mm.

The dielectric layers 51-56 are made from a high-temperature engineering thermoplastic (for layers 51, 52, 55 and 56) or from a reinforcement material (such as glass fibres) which is impregnated with the high-temperature engineering thermoplastic (for layers 53 and 54).

From the class of high-temperature engineering thermoplastics, we currently use: PEEK (polyether ether ketone), PEKK (polyetherketoneketone), PPS (polyphenylene sulphide), PEI (polyetherimide) or PES (polyethersulphone) or mixtures thereof. These materials have been selected based on the requirement for a suitable glass transition temperature and suitable thermal fatigue performance PEEK and PEKK are particularly preferred because PEEK has the necessary mechanical performance and is particularly receptive to a flame sprayed metal coating, and PEKK has similar properties but is easier to bond to the metal material.

The central or core dielectric layers 53, 54 which will lie on the neutral axis NA during the forming operation (see FIG. 7) are reinforced, and they constitute a central group 501 of the layers.

The dielectric layers 51, 52 which are positioned outward of (above) the central group 501 are not reinforced, and the layers 51, 52 constitute an upper (outer) group 502 of the layers.

The dielectric layers 55, 56 which are positioned outward of (below) the central group 501 are not reinforced, and the layers 55, 56 constitute a lower (outer) group 503 of the layers.

FIG. 3 shows only six dielectric layers, but additional dielectric layers may be included. The central group 501 is shown as comprising two reinforced layers, but additional reinforced layers may be included in the group, or the group could be reduced down to a single layer.

The reinforcement is preferably woven e-glass (electrical-grade glass). For example, 48 gsm plain-weave e-glass may be used, with a coating compatible with thermoplastic materials and processing temperatures (the coating promotes adhesion between the reinforcement and matrix, improving mechanical properties).

A heater element has been flame sprayed on the dielectric layer 53, and a temperature sensor has been flame sprayed on the dielectric layer 54. A conductive ground plane has been flame sprayed on the dielectric layer 55. This flame spraying may be done in the manner described in GB-A-2,477,336, GB-A-2,477,337, GB-A-2,477,338, GB-A-2,477,339, and GB-A-2,477,340 (all in the name of GKN Aerospace).

Figure 4:
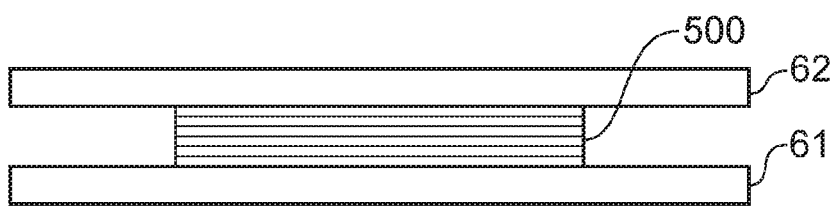

The stack 500 may be layed up on a flat, lower platen 61 (see FIG. 4). In the next stage of the manufacturing process, an upper platen 62 is brought into contact with the top of the stack. The platens 61, 62 are heated, and heat and pressure are applied by the platens 61, 62 to the stack 500 so that the dielectric layers are laminated together. The temperature applied to the stack 500 is typically around 400° C., which is above the melting point of the thermoplastic material of the dielectric layers 51-56. The result (shown in FIG. 5.) is a laminated preform 7 which is an intermediate product in the manufacturing process.

In the preform 7, the layers 51-56 have merged or fused together so that the preform 7 may be considered to be monolithic from a structural point of view. This is assisted when the thermoplastic material of the layers 51-56 is PEEK or PEKK, because these materials are particularly good at ensuring that the layers will fuse or bond together to become structurally monolithic and will not delaminate.

The platens 61, 62 are made of steel and are therefore suited to the lamination temperature of around 400° C.

Figure 5:
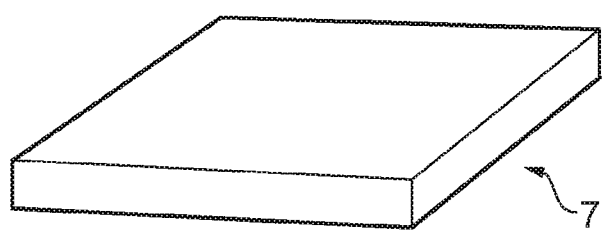

As may be seen in FIG. 5, the preform 7 at this stage of the manufacturing process is a flat (2-D) laminate. The preform 7 typically has a thickness of 1 mm or less.

Figure 6:
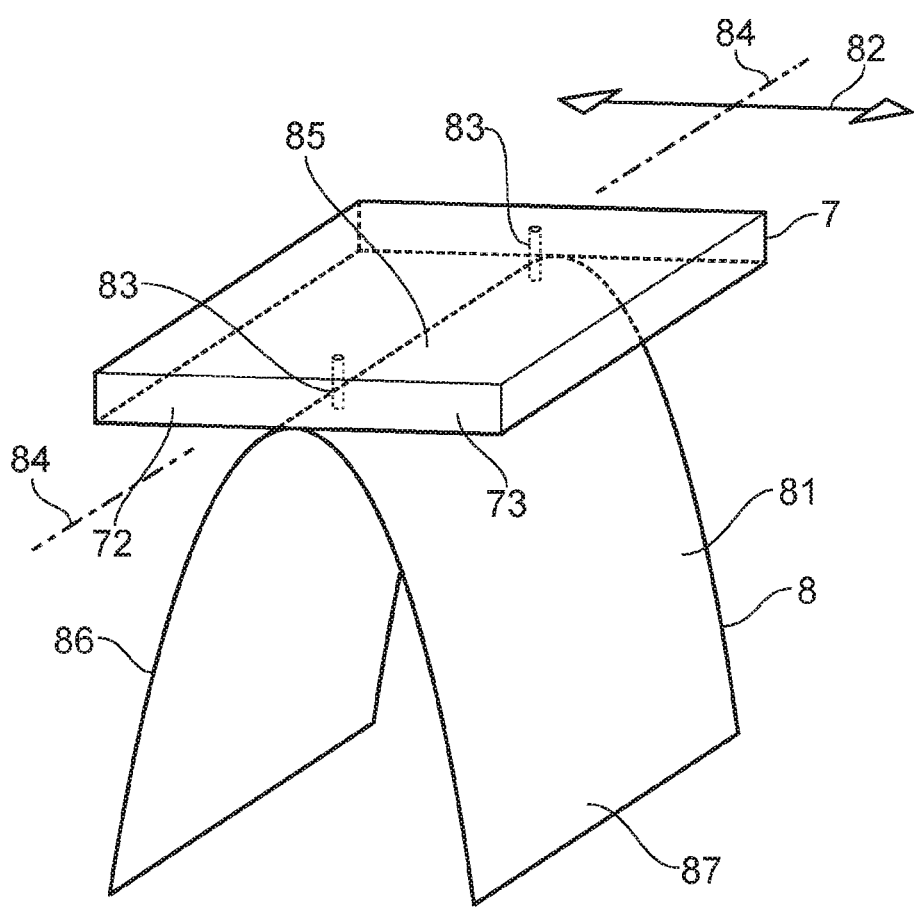

The next stage of the process is shown in FIG. 6, which is a diagrammatic perspective view of the preform 7 when positioned on a forming tool 8 having an outer tool surface 81 which is convex (generally U-shaped) in cross-section in the transverse direction 82. The tool 8 is provided with positioning pins 83 spaced apart in the longitudinal direction 84 along the ridge or apex 85 of the tool 8.

The tool 8 is diagrammatically drawn and, in practice, we include a strengthening frame inside the outer tool surface 81. The tool 8 will be subjected to temperatures in the order of 180° C.±30° C. and may therefore be made of aluminium, or at least the tool surface 81 which directly supports the preform 7 may be made of aluminium.

Figure 9:
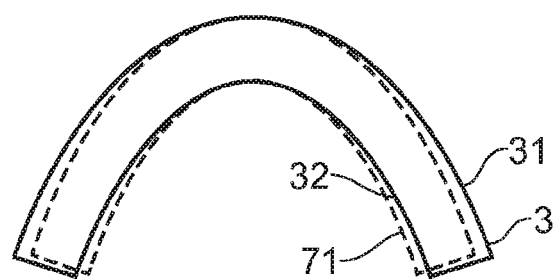

The purpose of the tool 8 is to change the configuration of the preform 7 from the first configuration (the planar or flat (2-D) configuration) of FIG. 5 to a desired final or second configuration shown in solid line in FIG. 9 in which the formed preform 7 is now a shaped heater mat 3 which is has a non-planar or curved (3-D) configuration.

When the preform 7 is formed on the tool surface 81 of the tool 8, the preform 7 will initially adopt the shape of the tool surface 81, and, when the preform 7 (the heater mat 3) is removed from the tool 8, it will spring back or expand outwards to some extent, with the amount of spring-back being dependent on factors such the duration and temperature of the forming operation.

The shape initially adopted by the preform 7 is shown in dashed line in FIG. 9 and is labelled 71. This shape may be thought of as being an intermediate (third) configuration adopted by the preform/heater mat, before it relaxes to the final (second) configuration shown in solid line.

The positioning pins 83 extend into apertures of complementary shape in the preform 7 in order to fix the relative positioning of the preform 7 on the tool 8. The apertures in the preform 7 are located along a longitudinal central axis of the preform 7 which is aligned with the longitudinal ridge direction 84. Thus, a first half 72 of the preform 7 will be formed onto a left-hand part 86 of the outer tool surface 81, and a second half 73 of the preform 7 will be formed onto a right-hand part 87 of the outer tool surface 81.

Figure 7:
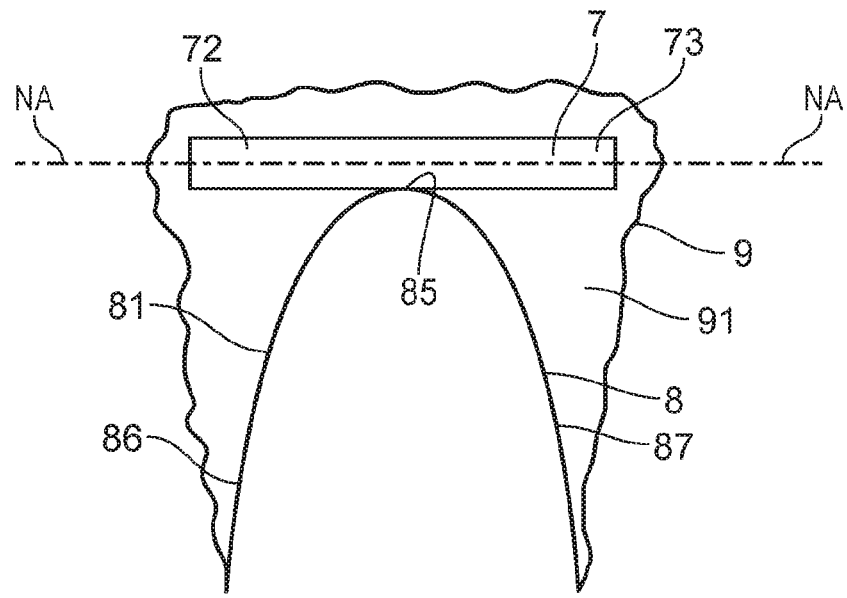
Figure 8:
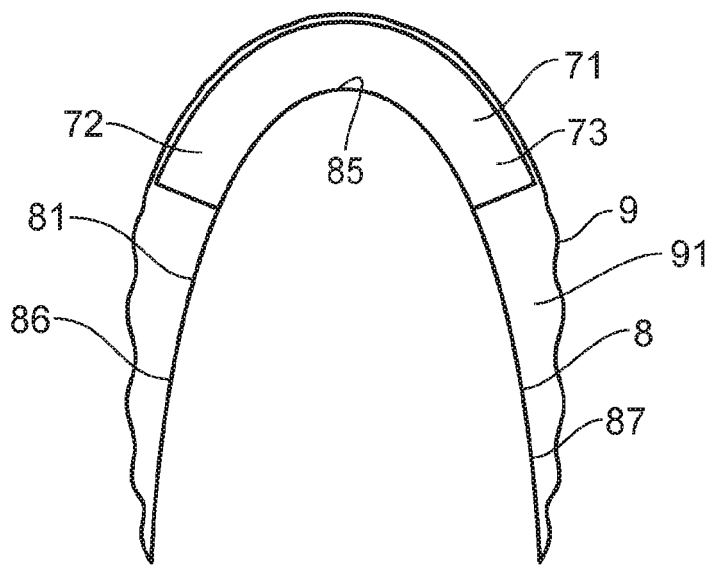

The next stage of the manufacturing process is shown in FIGS. 7 and 8 which are diagrammatic end views of the preform 7 and the tool 8.

An autoclave or the like is used to heat the preform 7 and the tool 8 to a temperature of about 180° C. for a period of about 30 minutes. The preform 7 is covered with a vacuum bag 9 and air is removed from the space 91 covered by the vacuum bag 9. The temperature of 180° C. is above the glass-transition point of 140° C. of the thermoplastic material of the dielectric layers 51-56, and thus the preform 7 undergoes a type of creep deformation and is formed down onto the outer tool surface 81. In the transition from FIG. 7 to FIG. 8, the preform 7 changes from the first, 2-D (planar) configuration to a non-planar, 3-D configuration which is the intermediate configuration 71.

In general, any form of applying heat and shape conformance may be used. For example, an oven with a vacuum bag may be used, or a heated press with appropriate pairs of matched-shape tooling may be used.

Because the reinforcement in the preform 7 is concentrated at the neutral axis NA (where the dielectric layers 53, 54 generally at the neutral axis are neither stretched nor compressed as the forming occurs), the forming operation can be accomplished at the relatively low temperature that is used (the typical temperature of 180° C.±30° C., or ±20° C., or ±10° C.) and thus, in turn, the tool 8 does not have to withstand the higher temperatures (e.g. at least 340° C.) that were previously typically used when forming a 2-D thermoplastic laminate into a 3-D shape. Thus, the tool surface 81 and much of the tool 8 may be made of aluminium instead of steel.

The absence of reinforcement in the outer dielectric layers 51, 52, 55, 56 helps to reduce brittleness and to provide stability during the forming process.

After 30 minutes or so, the preform 71 may be returned to ambient temperature, and the vacuum bag 9 may be removed. The preform 71 undergoes some spring-back and ends up in its final (second) configuration shown in solid line in FIG. 9 as the heater mat 3.

In other words, during the forming operation, the preform 7 is "over formed" (i.e., given more curvature in cross-section than is ultimately desired), and after the forming operation the preform 7 springs back to the final (slightly less curved) shape.

An important benefit of the relatively low temperature used in the forming operation (wherein the thermoplastic matrix material is only softened and is not melted) is that the functional electrical components of the preform/heater mat (such as the heater element, the temperature sensor and the conductive ground plane) are not impaired by the heating associated with the forming operation.

We have conducted trials to characterise the change in electrical characteristics of the functional components of the heater mat as a consequence of the heating applied to the preform/heater mat in the forming operation, and the trials have confirmed that there is only a minimal, repeatable resistance shift.

These trials have been undertaken by forming heating elements around the radius of a curvature, such that the long edge of the heating element undergoes maximum geometric strain. Separate experiments were conducted to establish the effect of varying both the width and thickness of heating elements (Table 1 and Table 2). All trials demonstrated a change in electrical resistance of no more than 2% as a consequence of forming. This is considered a small and repeatable result in the wider context of a heater mat manufacturing process.

In the trials, the electrical resistance of the heating element was measured pre-and-post forming with a meter of an accuracy suitable to the test.

TABLE 1

Resistance Shift of Various Heating Element Thicknesses as a Consequence of Forming

|  | Sample Set 1 | Sample Set 2 | Sample Set 3 | Sample Set 4 | Sample Set 5 |
| --- | --- | --- | --- | --- | --- |
| Heating Element Thickness | Thinnest | Thin | Mid-Range | Thick | Thickest |
| Average Resistance Shift Post-Forming | 0.42% | 1.26% | 0.22% | 0.42% | 0.15% |

TABLE 2

Resistance Shift of Various Heating Element Widths as a Consequence of Forming

|  | Sample Set 1 | Sample Set 2 | Sample Set 3 | Sample Set 4 | Sample Set 5 | Sample Set 6 | Sample Set 7 | Sample Set 8 | Sample Set 9 |
| --- | --- | --- | --- | --- | --- | --- | --- | --- | --- |
| Element Width | 2 mm | 3 mm | 4 mm | 5 mm | 6 mm | 8 mm | 10 mm | 12 mm | 14 mm |
| Average Resistance Shift Post-Forming | 0.74% | 0.89% | 0.68% | 0.67% | 0.84% | 1.00% | 0.98% | 1.04% | 1.19% |

Figure 10:
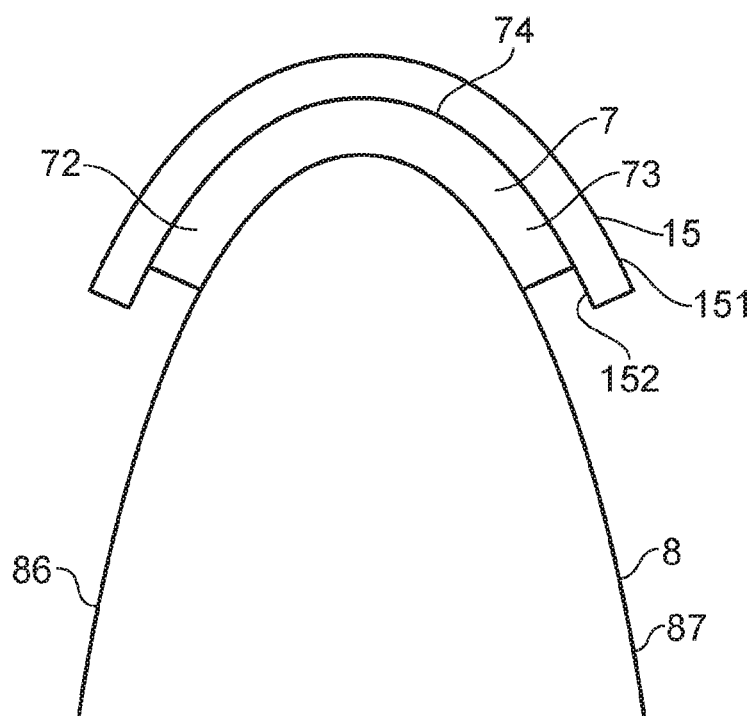
FIG. 10 shows a variation of the manufacturing method of the first example.

A variation of the manufacturing process is shown in FIG. 10. The vacuum bag 9 is not used in this variation. Instead, a component 15 made of thermosetting material is placed on top of the preform 7. The component 15 already has the second configuration. The component 15 has a convex outer (front) surface 151 and a concave inner (rear) surface 152. The concave inner surface 152 is placed on the top surface 74 of the preform 7 and sandwiches the preform against the tool 8. The temperature of the forming operation (the temperature of 180° C.±30° C., or ±20° C., or ±10° C.) serves to creep-form the preform 7 and also to cure the thermosetting material of the component 15 and to bond the preform 7 to the component 15.

Figure 11:
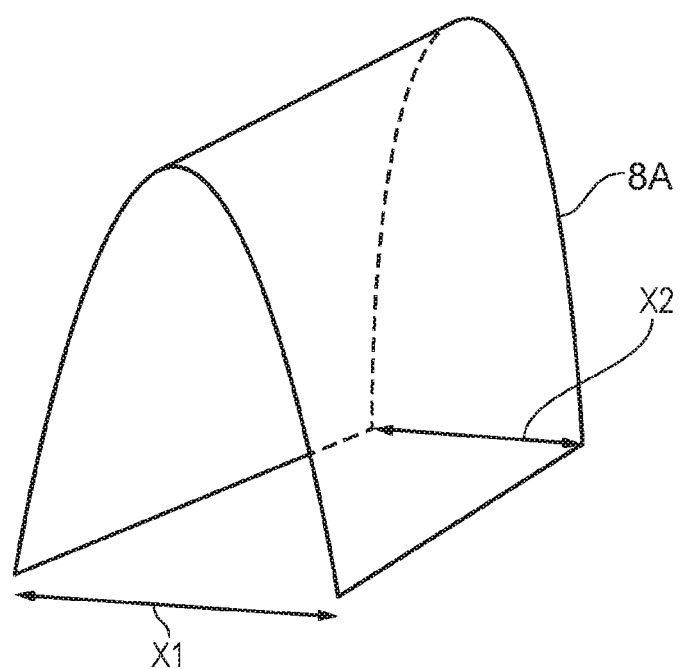
FIG. 11 shows a variation of the tool used in the first example.

FIG. 11 shows a tool 8A which is a variation of the tool 8 of FIG. 6. The tool 8A varies by tapering in the longitudinal direction 84 by becoming more curved (more convex) in the longitudinal direction. As may be seen in FIG. 11, the dimension X1 is greater than the dimension X2.

Figure 12:
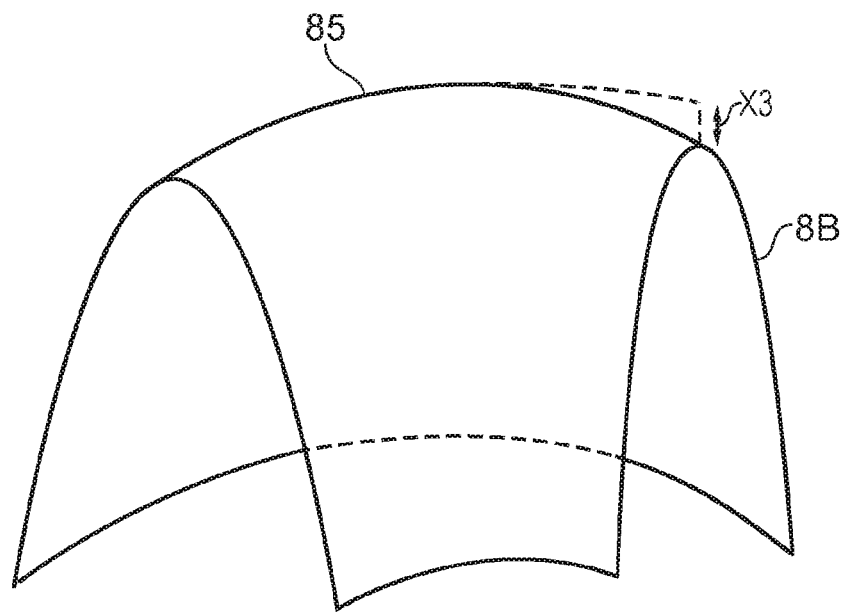
FIG. 12 show a further variation of the tool used in the first example.

FIG. 12 shows a tool 8B which is another variation of the tool 8 of FIG. 6. Compared with the tool 8, the tool 8B twists in the longitudinal direction 84 of tool 8. Tool 8B is shown as twisting to the right as viewed in FIG. 12. Also, with tool 8B, the ridge 85 is not level (as with tool 8) and instead the ridge reduces in height by the dimension X3.

The variations of shape embodied in tools 8A, 8B are visually exaggerated in FIGS. 11 and 12, but the variations may be used in practice to impart some slight degree of taper, twist and complex curvature to the preform 7 as it is formed into the final (second) configuration desired for the heater mat 3.

The invention claimed is:

1. A method of manufacturing an electrothermal heater mat, comprising:
   providing a preform that includes a laminated stack of dielectric layers made of thermoplastic material, the stack including a central group of one or more layers, and first and second outer groups of layers;
   wherein the central group includes reinforcement and the outer groups do not include reinforcement;
   wherein the preform includes a heater element and the preform has a first configuration;
   heating the preform to a temperature between a glass-transition temperature of the thermoplastic material and a melting point of the thermoplastic material;
   forming the heated preform into a second configuration which is different from the first configuration so as to produce the heater mat; and
   in the heating and forming steps, positioning the preform against a component including thermosetting material and using heating of the heating step to bond the preform to the component.

2. The method of claim 1, wherein the first configuration is a substantially planar configuration.

3. The method of claim 1, wherein the second configuration is a curved configuration in which the heater mat is non-planar.

4. The method of claim 1, wherein, in the second configuration, the heater mat is U-shaped in cross-section.

5. The method of claim 1, wherein:
   in the forming step, the preform is positioned on a tool which has a tool surface with a third configuration which is more curved than the second configuration and the preform is formed down onto the tool surface; and after the heater mat has been formed on the tool, the heater mat relaxes from the third configuration to the second configuration.

6. The method of claim 1, wherein in the heating step the preform is heated to and held at a temperature in a range of 150° C. to 210° C.

7. The method of claim 1, wherein in the forming step the heated preform is held at the temperature for a period of time from 15 to 60 minutes.

8. The method of claim 1, wherein the reinforcement is woven e-glass.

9. The method of claim 1, wherein in the forming step the heated preform is positioned on a tool having a tool surface with a ridge and the preform is formed around the ridge.

10. The method of claim 9, wherein the ridge includes positioning pins and the preform has apertures which are fitted onto the pins.

11. The method of claim 1, wherein in the forming step the heated preform is positioned on a tool having a convex tool surface and a vacuum bag is used to hold the preform down onto the convex tool surface.

12. The method of claim 1, wherein:
in the forming step the heated preform is positioned on a tool having a convex tool surface; and
after the forming step the heater mat produced by forming the preform is returned to an ambient temperature before the heater mat is removed from the tool surface.

13. The method of claim 1, wherein the second configuration is U-shaped in a transverse direction of the heater mat and tapers and/or twists in a longitudinal direction of the heater mat.

14. The method of claim 13, wherein the preform is formed against a tool which has a tool surface which is convex in a transverse direction and which becomes more convex in a longitudinal direction and/or twists in a longitudinal direction.

15. The method of claim 1, wherein the component has a surface which has the second configuration and to which the preform is bonded.

16. A method of manufacturing an electrothermal heater mat, comprising:
laying up a stack comprising substantially planar layers which include a plurality of dielectric layers and a heater element layer;
wherein each layer of the stack comprises thermoplastic material;
heating the stack to a first temperature and laminating together the layers of the stack so as to produce a preform;
positioning the preform on a convex surface of a tool;
heating the preform to a second temperature which is lower than the first temperature and is in a range of 150° C. to 210° C.;
forming the preform around the convex surface of the tool; and
in the heating and forming steps, positioning the preform against a component including thermosetting material and using heating of the heating step to bond the preform to the component.

17. The method of claim 16, wherein, in the heating and forming steps, the preform is positioned between the tool and the component.

* * * * *